Figure 1:
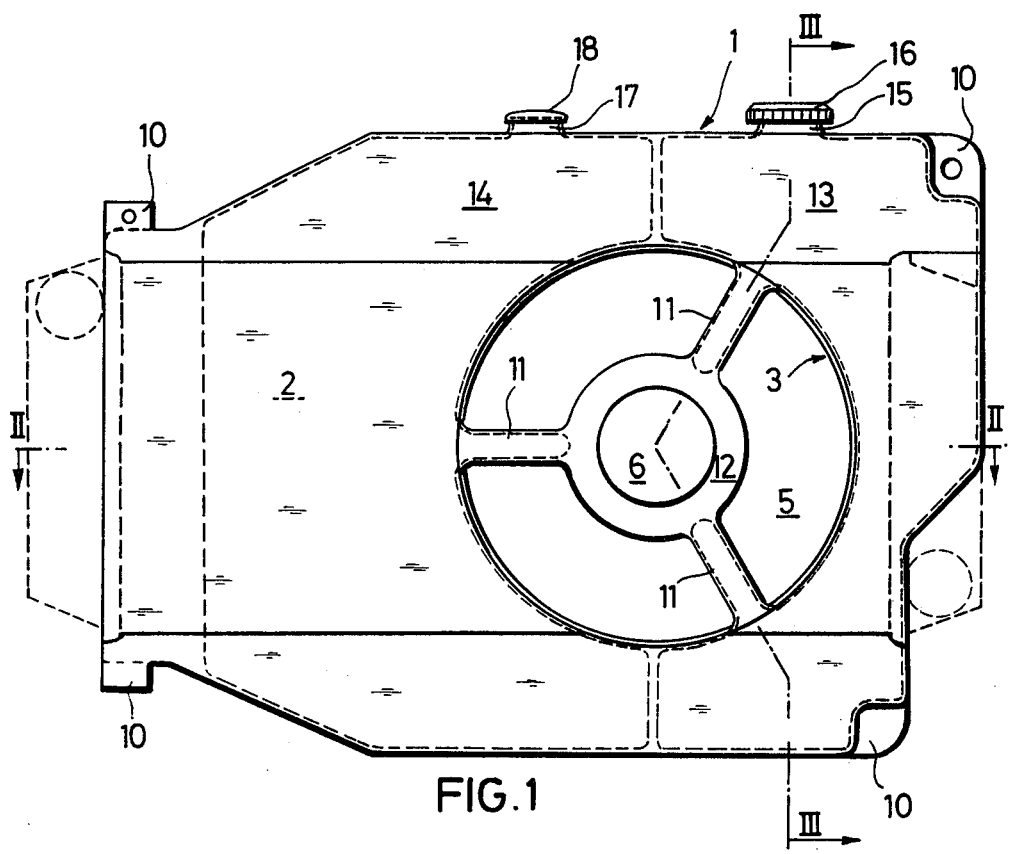

United States Patent [19]
Rest et al.

[11] 4,441,463
[45] Apr. 10, 1984

[54] CONTAINER FOR FLUIDS FOR OPERATING FUNCTIONS IN MOTOR VEHICLES

[75] Inventors: Heinz Rest; Martin Ufrecht, both of Cologne, Fed. Rep. of Germany

[73] Assignee: Ford Motor Company, Dearborn, Mich.

[21] Appl. No.: 475,005

[22] Filed: Mar. 14, 1983

[30] Foreign Application Priority Data

Mar. 20, 1982 [DE] Fed. Rep. of Germany ....... 3210260

[51] Int. Cl.³ .............................................. F01P 3/18
[52] U.S. Cl. .............................. 123/41.27; 123/41.31; 123/41.5; 123/195 A; 220/22
[58] Field of Search ............... 123/41.27, 41.51, 41.55, 123/41.29, 41.21, 41.01, 41.02, 41.08, 41.09, 41.1, 41.5, 195 A, 195 C, 195 S, 198 E; 180/68 R; 220/20, 22; 165/41

[56] References Cited
U.S. PATENT DOCUMENTS

| | | | |
|---|---|---|---|
| 1,337,576 | 4/1920 | Weeks | 123/41.51 |
| 1,608,600 | 11/1926 | Howe | 123/41.27 |
| 1,906,072 | 4/1933 | Lumsdem | 123/41.27 |
| 2,804,860 | 9/1957 | Tacchella et al. | 123/41.21 |
| 4,274,556 | 6/1981 | Thiessen | 220/22 |

Primary Examiner—William A. Cuchlinski, Jr.
Attorney, Agent, or Firm—Robert E. McCollum; Clifford L. Sadler

[57] ABSTRACT

A container for fluids for various operating functions in a motor vehicle, the container being arranged in the engine compartment and being constructed as an essentially annular or U-shaped hollow body with an inner contour forming an air guide surface or shroud defining an air guide duct for the air cooling fan of the internal combustion engine and having an outer contour shaped to conform to the shape of the radiator associated therewith, the radiator being received within the outer contour within a holding means by way of resilient foam mountings.

11 Claims, 6 Drawing Figures

CONTAINER FOR FLUIDS FOR OPERATING FUNCTIONS IN MOTOR VEHICLES

The invention relates to a container for a number of fluids, each to be used in connection with a different engine operation in a motor vehicle.

A container of this type is known from the German patent (Utility Model) No. 72 07 701, in which two different operating fluids—the coolant for the internal combustion engine and the washing liquid for the window washing unit—are held in chambers separate from one another.

This known design and arrangement of the container has the disadvantage that where space is restricted in the engine compartment of the motor vehicle, it is difficult to accommodate a container of the desired volume.

The fact that to an increasing extent washing liquid for a headlamp washing unit must be included in substantial volume in addition to a washing liquid for the window washing unit has led to a plurality of separate containers being mounted in the engine compartment on separate fastening means.

An object of the invention is to develop a container of the type described above that permits the arrangement in one component of a number of containers of large volume, and permits attachment in an operable position at a location where normally there is the necessary space.

This object is attained according to the invention by a hollow container having an essentially annular or U-shape and attached to the backside of the radiator, with an outer contour similar to the outer contour of the radiator, to fit within the engine compartment along with the radiator, the inner contour being circular in cros-section in the preferred embodiment and constituting an annular air guide surface that defines an air duct or aperture for an air cooling fan.

The inner contour of the container also defines arms that project into the open space of the air guide duct to form supports for an axial flow type cooling fan to be mounted thereon. It will be clear, of course, that the inner contour of the container can have an air duct shape that is rectangular in cross-section instead of circular as shown, or other desired shapes, to accommodate a cross-flow type cooling fan, for example.

Another object of the invention is to provide a container of the type described in which the hollow interior or cavity is divided into a number of fluid chambers, each with its own filler neck and cap, and warmed by the hot air that contacts the walls of the container after flowing through the radiator.

In the illustrated embodiment, the annular or U-shaped cavity of the container is advantageously divided into two chambers, of which one acts as a compensating tank for the cooling system of an internal combustion engine cooled by a liquid coolant, and the other adjacent chamber acts as a storage tank for the washing liquid of a window washing unit. In this connection, the washing liquid is advantageously warmed by the hot air which strikes the walls of the container after flowing through the radiator.

Due to the particular design and arrangement of the multi-fluid container of this invention, a more efficient use of the space is achieved in the arrangement of the container in the engine compartment; in addition, a considerable reduction in cost is attained in production and assembly as compared with the use of a plurality of separate containers formerly required for the same operating fluid agents.

While the container constructed according to the invention is a single component, it provides a number of functions such as that of an air guide shroud for the air cooling fan, that of separate containers for various operating fluids, and that of a mounting for the cooling fan. The container advantageously may be produced from plastic material by injection or blow molding or the like, and constructed as an attachment to the radiator.

The design and arrangement of the container in this case first of all ensures good accessibility to the filler necks of each of the separate chambers, and, in addition, provides a liquid jacket virtually surrounding the air cooling fan to advantageously absorb vibrations and noise produced by the fan.

Figure 2:
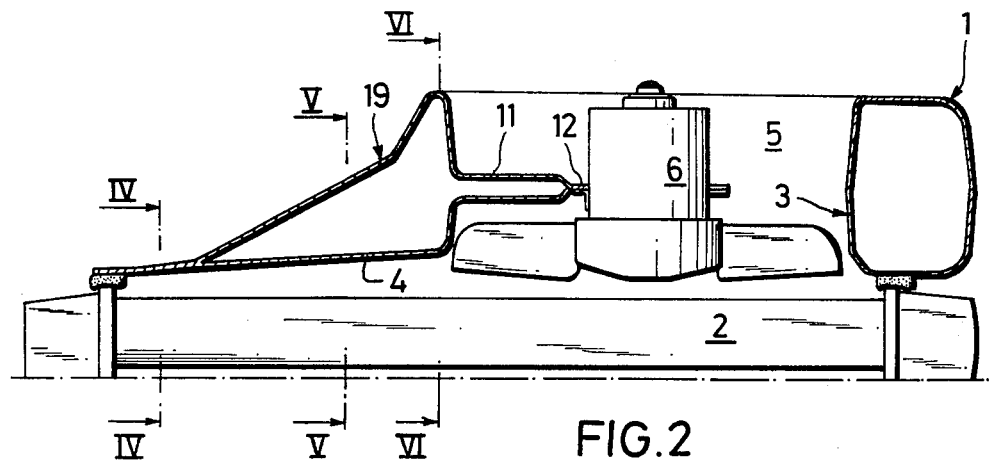
Figure 3:
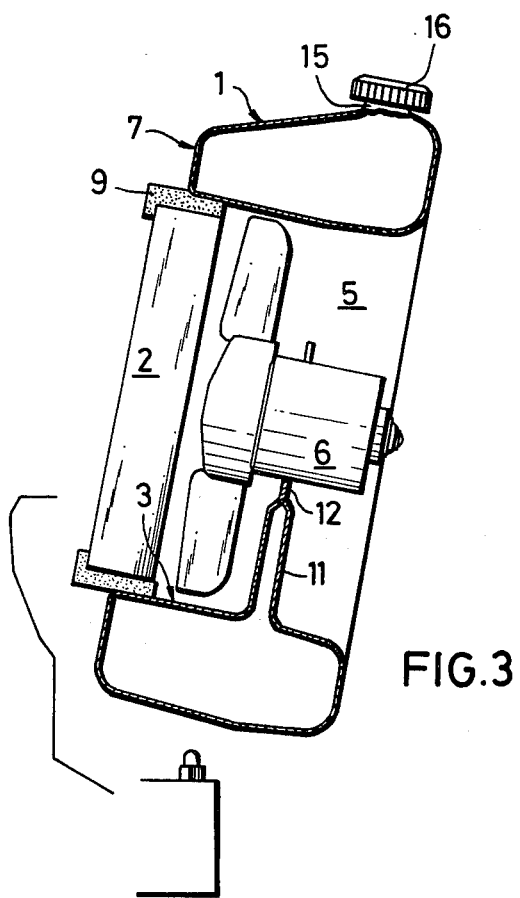
Figures 4, 5:
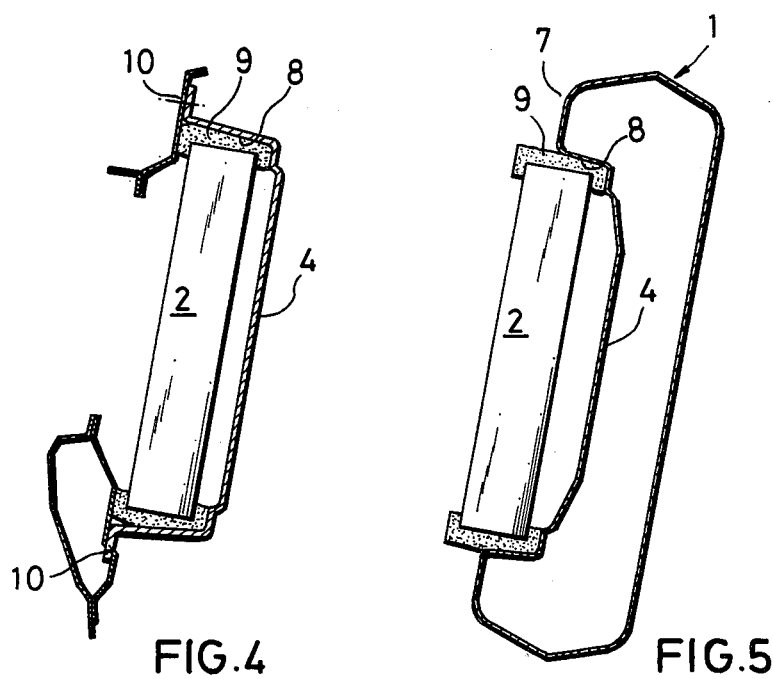
Figure 6:
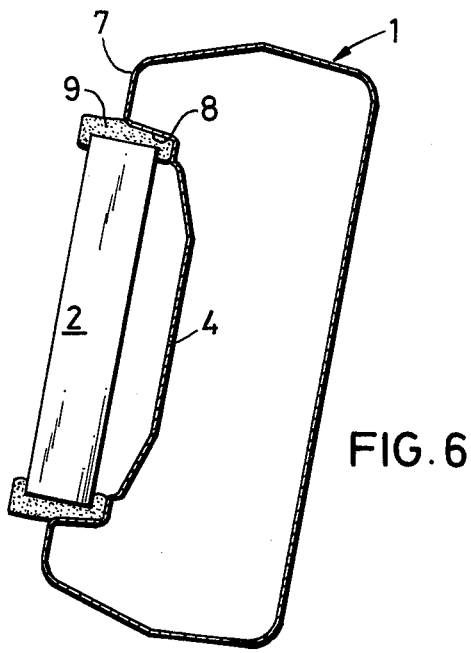

Other objects, features and advantages of the invention will become apparent upon reference to the succeeding detailed description thereof, and to the drawings illustrating the preferred embodiment thereof; wherein, FIG. 1 is a front elevational view of a container design and arrangement embodying the invention, the radiator being shown in broken lines in order to better indicate the shape of the container;

FIG. 2 is a section along the line II—II in FIG. 1;
FIG. 3 is a section along the line III—III in FIG. 1;
FIG. 4 is a section along the line IV—IV in FIG. 2;
FIG. 5 is a section along the line V—V in FIG. 2; and
FIG. 6 is a section along the line VI—VI in FIG. 2.

A container for fluids used in various engine operations in a motor vehicle is designated 1 in the Figures. The container may be produced as a plastic component in known manner by injection or blow molding. The container 1 is associated with a radiator 2 and has an inner contour 3 and an outer contour 7. The inner contour forms an air guide surface 4 that defines an air guide duct 5 for an air cooling fan 6. The outer contour 7 is shaped as shown to conform essentially to the outer contour of radiator 2.

In the example illustrated, the air guide duct 5 formed by the inner contour 3 has a circular cross-section, and is formed with circumferentially spaced arms 11. The arms project radially inwardly to form an annular holding means 12 for an axial flow type air cooling fan 6. The inner contour 3 of the container also, of course, may have other shapes, such as a rectangular cross-section if the fan is a cross-flow type fan.

The container 1 is provided with a holding or mounting means 8 for radiator 2, which is secured in place by way of annular resilient foam mountings 9. The front corners of container 1 have integrally formed mounting flanges 10 for securing the container 1 to the forward bodywork structure of the vehicle by conventional fastening means such as screw, plug or clip fastenings.

The resilient foam mountings 9 may be secured to the aluminium ribs of the radiator 2 by adhesion, and form a protection against damage before and after the assembly of radiator 2.

As may be seen from FIG. 1, the hollow annular interior of the container is divided into separate fluid chambers 13 and 14 indicated by broken lines. The chambers are accessible by way of separate filler necks 15 and 17 which may be closed by corresponding caps 16 and 18. In the embodiment illustrated, the chamber 13 is provided as a compensating tank for the cooling system of a liquid cooled internal combustion engine, while chamber 14 acts as a storage tank for liquid used in a window washing unit and a headlamp washing unit.

With the container attached to the rear or downstream side of the radiator, a warming of the washing liquid for the window washing unit is accomplished in a particularly advantageous manner, as the heated air coming from the radiator acts directly upon the walls of the container.

Indented or angled wall surfaces 19 are provided to allow an expansion or deformation of the container by movement of the wall surfaces, if the contents of the container should freeze during cold weather, to prevent destruction of the container or a breakdown in the operation of the air cooling fan.

While the invention has been shown and described in its preferred embodiment, it will be clear to those skilled in the arts to which it pertains that many changes and modifications may be made thereto without departing from the scope of the invention.

We claim:

1. A container for fluids for use in various operating functions in motor vehicles, such as for containing windshield washer fluid and engine coolant, the container being arranged in the engine compartment of the motor vehicle and having an outer contour adapted for attachment in an operative position to the radiator, characterized by an essentially hollow annular body having an inner contour forming an annular air guide surface defining an air guide duct for an air cooling fan for an internal combustion engine cooperating therewith, and having the outer contour shaped to the contour of the radiator with which it is associated.

2. A container according to claim 1, characterized in that the air duct is circular in cross-section.

3. A container according to claims 1 or 2, the inner contour including support arms that extend radially into the air guide duct for supporting the fan.

4. A container according to claim 3, characterized in that the annular hollow body is divided into a plurality of separate fluid chambers having separate filler necks for holding different operating fluids and closed by separate caps.

5. A container according to claim 4, characterized in that the container includes holding means for mounting the radiator therein, and resilient foam mounting means fastening the radiator to the holding means.

6. A container according to claim 5, the container including indented surfaces movable to prevent damage to the container in response to deformation of the container due to freezing of the fluid.

7. A container according to claim 1 in which the inner contour forms an air guide duct that is rectangular in cross-section.

8. A container according to any of claims 1, 2 or 7, characterized in that the annular hollow body is divided into a plurality of separate fluid chambers having separate filler necks for holding different operating fluids and closed by separate caps.

9. A container according to claim 8, characterized in that one of the chambers contains the washing liquid of a window washing unit and another of the chambers constitutes a compensating tank for the liquid coolant used in the cooling system of a liquid cooled internal combustion engine.

10. A container according to any of claims 1, 2, or 7, characterized in that the container includes holding means for mounting the radiator therein, and resilient foam mounting means fastening the radiator to the holding means.

11. A container according to any of claims 1, 2, or 7, the container including indented surfaces movable to prevent damage to the container in response to deformation of the container due to freezing of the fluid.

* * * * *